Patented July 13, 1954

2,683,737

UNITED STATES PATENT OFFICE 2,683,737

AROMATIC HYDROCARBON ESTERS OF BASICALLY SUBSTITUTED ARALKYL-CARBAMATES AND SALTS THEREOF

John W. Cusic, Skokie, Ill., assignor to G. D. Searle & Co., Chicago, Ill., a corporation of Illinois No Drawing. Application December 17, 1951, Serial No. 262,190

8 Claims. (Cl. 260—471)

The present invention is concerned with a new group of carbamates and, especially, with the basically substituted aralkyl carbamates of the structural formula

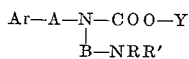

and their salts, wherein Ar is a lower aryl radical, A and B are lower, bivalent, saturated, aliphatic hydrocarbon radicals, Y is an aromatic hydrocarbon radical containing 6 to 15 carbon atoms, and NRR' is either a dialkylamino radical or a nitrogen-containing saturated heteromonocyclic radical attached to the radical B through a nitrogen in the heterocycle.

In the foregoing structural formula Ar is an aryl hydrocarbon radical containing 6 to 15 carbon atoms such as phenyl, tolyl, xylyl, naphthyl, methylnaphthyl, fluorenyl, phenanthryl, and anthracyl. Y is an aromatic hydrocarbon radical of the same type as Ar or a lower aralkyl radical such as benzyl, phenethyl, phenylpropyl, naphthylmethyl, methylbenzyl, and the like. The radicals A and B are lower, bivalent, saturated, aliphatic hydrocarbon radicals derived from such straight-chained or branch-chained hydrocarbons as ethylene, propylene, butylene, amylene, hexylene, or polymethylene radicals such as trimethylene to octamethylene. However, while A can be methylene, B must contain at least 2 carbon atoms spaced between the 2 nitrogen atoms.

The radicals R and R' can be lower alkyl radicals such as methyl, ethyl, straight-chained and branch-chained propyl, butyl, amyl, and hexyl. The radical NRR' can also be a nitrogen-containing heteromonocyclic radical such as a morpholino, pyrrolidino, piperidino, or a lower alkylated pyrrolidino or piperidino radical.

The esters which constitute this invention are conveniently prepared by heating a chloroformate of the structural formula

with an amine of the following structural formula

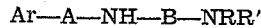

all symbols being defined as hereinabove, in an inert organic solvent such as a lower aromatic hydrocarbon or a lower alkanone.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The carbamates described and claimed in the present application are valuable as intermediates in organic synthesis. They are of value because of their medicinal action on neuromuscular and other organic functions, especially that of the kidney and particularly as diuretics. Certain of the salts are also of value as active ingredients in parasiticidal compositions.

The following examples are presented in order to illustrate in further detail the compounds which constitute the invention and the methods for preparing them. The details set forth are in no way to be construed as limiting the invention in spirit or in scope. It will be apparent to those skilled in the art that many conventional modifications in methods, conditions, and materials can be used without departing therefrom. In these examples the temperatures are given uncorrected in degrees centigrade (° C.), pressures during vacuum distillation in millimeters (mm.) of mercury and quantities in parts by weight.

EXAMPLE 1

*Phenyl ester of N-(β-diethylaminoethyl)benzylcarbamic acid*

156 parts of phenyl chloroformate are mixed with 103 parts of N-(β-diethylaminoethyl)benzylamine in 800 parts of butanone. A vigorous reaction occurs at once which is completed by heating at reflux temperature for 2 hours. The resulting solution is concentrated and treated with dilute hydrochloric acid. The aqueous layer is separated, rendered alkaline by addition of dilute sodium hydroxide and extracted with ether. This extract is dried over anhydrous potassium carbonate, filtered and evaporated. The residue of the phenyl ester of N-(β-diethylaminoethyl) benzylcarbamic acid is distilled at about 192–194° C. and 2 mm. pressure.

An ether solution of this base is treated with one equivalent of a 25% solution of hydrogen chloride in anhydrous isopropanol. Upon storage at 0° C., the hydrochloride precipitates which, recrystallized from ethyl acetate, melts at about 81–82° C. The hygroscopic crystals have the structural formula

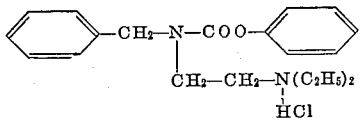

EXAMPLE 2

*Phenyl ester of N-(β-diethylaminoethyl)-α-methyl-benzylcarbamic acid*

Upon mixing of 170 parts of phenyl chloroformate and 220 parts of N-(β-diethylaminoethyl)-α-phenylethylamine in 1700 parts of anhydrous toluene, a reaction occurs spontaneously which is completed by heating at reflux temperature for 10 hours. The resulting solution is extracted with dilute hydrochloric acid and the extract rendered alkaline by addition of sodium hydroxide. The base is extracted with ether and the ether extract is dried over anhydrous potassium carbonate, filtered and evaporated to yield the phenyl ester of N-(β-diethylaminoethyl)-α-methyl-benzylcarbamic acid as an oil which is distilled at about 193–195° C. and 2 mm. pressure.

A solution of the distillate in ether is treated with alcoholic hydrogen chloride and the resulting solution is kept at 0° C. until crystallization occurs. Recrystallized from butanone, the hydrochloride melts at about 139–140° C. The salt has the structural formula

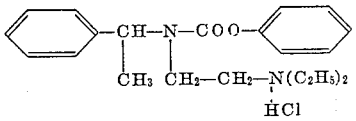

EXAMPLE 3

*2,4-xylyl ester of N-(β-morpholinoethyl)-β-(2-naphthyl)-ethylcarbamic acid*

A mixture of 369 parts of 2,4-dimethylphenyl chloroformate and 568 parts of N-(β-morpholinoethyl)-β-(2-naphthyl)ethylamine in 3500 parts of xylene is heated at reflux temperature for 12 hours, concentrated and treated with dilute hydrochloric acid. The aqueous layer is separated, washed with ether, and rendered alkaline by addition of sodium hydroxide. The base is extracted with ether, dried over anhydrous calcium sulfate, stirred with decolorizing charcoal, filtered and evaporated to yield the 2,4-xylyl ester of N-(β-morpholinoethyl)-β-(2-naphthyl)ethylcarbamic acid as a high boiling, light amber oil which has the structural formula

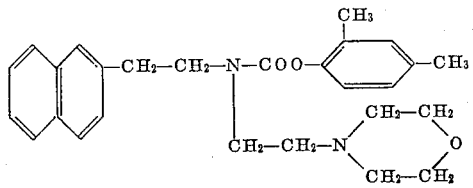

EXAMPLE 4

*Benzyl ester of N-(β-diethylaminoethyl) benzylcarbamic acid*

Upon mixing of 250 parts of benzyl chloroformate and 206 parts of N-(β-diethylaminoethyl)benzylamine in 1700 parts of benzene, a vigorous reaction occurs which is completed by heating at reflux temperature for an hour. Ethanol is added to decompose the excess chloroformate. The reaction mixture is then extracted with dilute hydrochloric acid and the extract rendered alkaline by addition of sodium hydroxide and extracted with ether. The ether extract is dried over anhydrous potassium carbonate, filtered and evaporated to leave as a residue the benzyl ester of N-(β-diethylaminoethyl) benzylcarbamic acid, which is distilled at about 193–195° C. and 1 mm. pressure.

A solution of the distillate in ether is treated with one equivalent of alcoholic hydrogen chloride and maintained at 0° C. The resulting precipitate is recrystallized from ethyl acetate to yield the hydrochloride melting at about 93–94° C. It has the structural formula

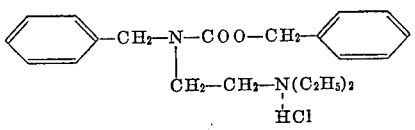

EXAMPLE 5

*Benzyl ester of N-(β-diethylaminoethyl)-α-methyl-benzylcarbamic acid*

A mixture of 250 parts of benzyl chloroformate and 220 parts of N-(β-diethylaminoethyl)-α phenylethylamine in 1700 parts of anhydrous toluene is heated at reflux temperature for 12 hours and after cooling treated with dilute hydrochloric acid. The aqueous layer is separated, rendered alkaline by addition of potassium hydroxide and extracted with ether. The ether extract is dried over anhydrous potassium carbonate, filtered and evaporated to yield the oily benzyl ester of N-(β-diethylaminoethyl)-α-methyl-benzylcarbamic acid which is distilled at about 187–190° C. and 2 mm. pressure. It has the structural formula

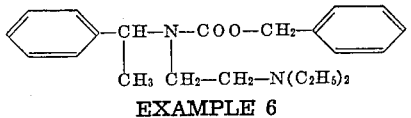

EXAMPLE 6

*β-(1-naphthyl) ethyl ester of N-(δ-dimethylaminobutyl)-β-(p-tolyl) ethylcarbamic acid*

A mixture of 101 parts of β-(1-naphthyl) ethyl chloroformate and 100 parts of N-(δ-dimethylaminobutyl)-β-(p-tolyl) ethylamine in 1000 parts of xylene is heated at reflux temperature for 12 hours and then concentrated and treated with dilute hydrochloric acid. The aqueous layer is separated, washed with ether, rendered alkaline by addition of ammonium hydroxide and then extracted with ether. The resulting ether extract is dried over anhydrous calcium sulfate, stirred with decolorizing charcoal, filtered and evaporated to yield the β-(1-naphthyl) ethyl ester of N-(δ-dimethylaminobutyl)-β-(p-tolyl)-ethylcarbamic acid as a high boiling, orange oil which has the structural formula

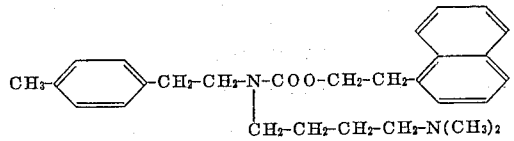

I claim:
1. The new group of organic compounds consisting of the esters of the structural formula

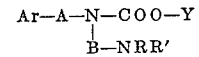

and salts thereof, wherein Ar is a member of the class consisting of phenyl, lower alkylphenyl and naphthyl radicals, A is a lower, bivalent, saturated, aliphatic hydrocarbon radical, B is a lower, bivalent, saturated, aliphatic hydrocarbon radical containing at least 2 carbon atoms, Y is a member of the class consisting of phenyl, lower alkylphenyl, phenyl-(lower)alkyl and naphthyl-(lower)alkyl radicals, and NRR' is a member of the class consisting of lower dialkylamino, morpholino, piperidino and pyrrolidino radicals.

2. The carbamates of the structural formula

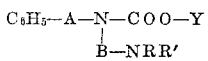
$$C_6H_5-A-N-COO-Y$$
$$\quad\quad\quad\; |$$
$$\quad\quad\quad B-NRR'$$

wherein A is a lower, bivalent, saturated, aliphatic hydrocarbon radical, B is a lower, bivalent, saturated, aliphatic hydrocarbon radical containing at least 2 carbon atoms, Y is a lower phenylalkyl radical, and R and R' are lower alkyl radicals.

3. The carbamates of the structural formula

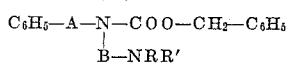
$$C_6H_5-A-N-COO-CH_2-C_6H_5$$
$$\quad\quad\quad\; |$$
$$\quad\quad\quad B-NRR'$$

wherein A is a lower, bivalent, saturated, aliphatic hydrocarbon radical, B is a lower, bivalent, saturated, aliphatic hydrocarbon radical containing at least 2 carbon atoms, and R and R' are lower alkyl radicals.

4. The carbamates of the structural formula

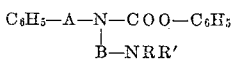
$$C_6H_5-A-N-COO-C_6H_5$$
$$\quad\quad\quad\; |$$
$$\quad\quad\quad B-NRR'$$

wherein A is a lower, bivalent, saturated, aliphatic hydrocarbon radical, B is a lower, bivalent, saturated, aliphatic hydrocarbon radical containing at least 2 carbon atoms, and R and R' are lower alkyl radicals.

5. Benzyl ester of N-($\beta$-diethylaminoethyl)-benzylcarbamic acid.

6. Benzyl ester of N-($\beta$-diethylaminoethyl)-$\alpha$-methyl-benzylcarbamic acid.

7. Phenyl ester of N-($\beta$-diethylaminoethyl)-benzylcarbamic acid.

8. Phenyl ester of N-($\beta$-diethylaminoethyl)-$\alpha$-methyl-benzylcarbamic acid, having the formula

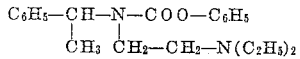
$$C_6H_5-CH-N-COO-C_6H_5$$
$$\quad\quad\;\; |\quad\; |$$
$$\quad\quad\; CH_3\; CH_2-CH_2-N(C_2H_5)_2$$

References Cited in the file of this patent

UNITED STATES PATENTS

| Number | Name | Date |
|---|---|---|
| 1,527,686 | Hartmann | Feb. 24, 1925 |
| 2,208,485 | Aeschlimann | July 16, 1940 |